Patented May 7, 1940

2,199,776

UNITED STATES PATENT OFFICE 2,199,776

WATER-SOLUBLE CONDENSATION PRODUCT AND ITS MANUFACTURE

Fritz Becherer, Riehen, near Basel, Switzerland, assignor to the firm J. R. Geigy A. G., Basel, Switzerland No Drawing. Application May 18, 1938, Serial No. 208,719. In Switzerland May 24, 1937

5 Claims. (Cl. 260—386)

This invention relates to the manufacture of water-soluble condensation products, that may be used for various purposes in industry.

It has now been found that valuable condensation products are obtained of the general formula:

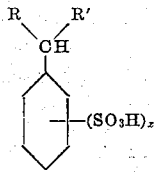

(in which $x$ is 1 or 2, R is an unsubstituted or substituted aromatic hydrocarbon residue or hydroaromatic hydrocarbon residue containing unsaturated bonds, R' is the same residue as R or an aromatic residue containing a hydroxyl group which may also be further substituted, and wherein the benzene nucleus, which carries one or a plurality of sulphonic acid groups, may in addition contain halogen and nitro groups), if aromatic aldehyde sulphonic acids or their functional derivatives are condensed with unsubstituted or substituted aromatic or condensible hydro-aromatic hydrocarbons, either in the molecular ratio 1:2 or with hydrocarbon components reduced to the ratio 1:1, and the intermediate compounds, which are still capable of reaction, are further condensed with phenols, or their derivatives or substitution products.

Advantageously, the process is carried out by condensing the hydrocarbon in the presence of a solvent, a diluting or a condensing medium such as sulphuric acid at various concentrations, glacial acetic acid, chlorosulphonic acid, or hydrochloric acid, $ZnCl_2$, with an aldehyde mono- or poly-sulphonic acid to the end stage or at least until the aldehyde reaction has disappeared, and then combining the intermediate product with a phenol to form the end product. The conditions of temperature and time of this reaction may be varied within wide limits and depend largely on the condensability of the compounds used.

The products may be used for the most varied purposes in industry. In a number of cases they represent very effective wetting, emulsifying, and dispersing agents and detergents. Furthermore, some of the new compounds are eminently suited as reserving agents for wool in the half-wool dyeing industry.

Example 1

To a mixture of 900 gms. of concentrated sulphuric acid, 250 gms. of glacial acetic acid and 128 gms. of naphthalene are added 266 gms. of benzaldehyde-2:4-disulphonic acid and the whole stirred for 4 hours at 35–40° C. After this period the aldehyde reaction can no longer be observed. The product is cooled to 20° C. and 164 gms. of butyl-o-cresol added bit by bit. The final condensation is completed after several hours, and the product has then become soluble in water. The action product, a resinous material, which has separated out is removed from the acid, is dissolved in water, and after neutralisation which may be made with lime, it is freed with steam from unchanged starting materials. The resulting solution may be evaporated to dryness or the final product may be precipitated by sodium chloride, filtered and dried. A bright powdered product is obtained which represents a very satisfactory reserving agent.

Example 2

130 gms. of naphthalene are fused with 100 gms. of glacial acetic acid and the melt is stirred into 1100 gms. of concentrated sulphuric acid in which are suspended 230 gms. of 2-chlorobenzaldehyde-5-sulphonic acid. After stirring for several hours at 40–50° C., no further aldehyde sulphonic acid is observable and the naphthalene is also used up except for traces. 206 gms. of di-isobutyl phenol are now added and the whole further condensed at the same temperature until a test portion is found to form a clear solution, without any separation, in water. Further treatment can be carried out in accordance with one of the methods set forth in Example 1.

Example 3

231 gms. of 2-chlorobenzaldehyde-5-sulphonic acid are added to a mixture of 274 gms. of tertiary butylcyclohexene, 850 gms. of concentrated sulphuric acid and 400 gms. of glacial acetic acid, and the mixture is maintained at 40–50° C. until the aldehyde sulphonic acid has practically disappeared and the product has become soluble in water. The whole is then diluted with a mixture of ice and water, the condensation product is precipitated by means of brine, and after neutralisation is dried. The condensation product is a slightly brown-coloured powder with very distinct wetting property.

As aldehyde sulphonic acids 2-, 3- or 4-benzaldehyde sulphonic acid, 2:5- or 2:6-benzaldehyde disulphonic acid can be used with equal success; instead of naphthalene may be used amyl-naphthalene, chloronaphthalene, phenanthrene, anthracene or tetraline.

Furthermore, as phenols, chloramylphenol, di-isobutyl-phenol, p-tertiary butyl phenol, butylcresol (from a mixture of the three cresols), amylphenol, cyclohexylphenol, or benzylphenol can be employed.

Of the condensible hydroaromatic compounds may be mentioned:

Cyclohexene, amyl-cyclohexene, methyl-tertiary-butyl-cyclohexene, di-isobutylcyclohexene, fenchene, abietene.

What I claim is:

1. Textile assistants, particularly adapted for use as wool reserving agents, being in the free state of the following formula

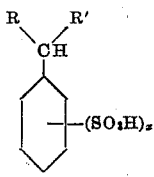

wherein

R represents the residue of a member of the group comprising aromatic and hydroaromatic hydrocarbons containing unsaturated bonds capable of being condensed with benzaldehyde sulphonic acids, and R' represents the residue of a member of the group above described for R with the addition of a condensible monohydric body of the benzene series.

$x$, being an integer from 1 to 2, being when neutralised and evaporated, colorless powders of good solubility in water, the aqueous solutions of which possess remarkable capillary properties.

2. Textile assistants, particularly adapted for use as wool reserving agents, being the products of reaction of 1 mol. of a benzaldehyde-sulphonic acid with 1 mol. of naphthalene and 1 mol. of a nuclear alkylated condensible phenol of the benzene series, being when neutralised and evaporated colorless powders of good solubility in water, the aqueous solutions of which possess remarkable capillary properties.

3. A textile assistant, particularly adapted for use as a wool reserving agent, being the product of reaction of 1 mol. of benzaldehyde-o-sulphonic acid with 1 mol. of naphthalene and 1 mol. of di-isobutyl-phenol, being when neutralised with an alkali and evaporated, a colorless powder of good solubility in water, the aqueous solutions of which possess remarkable capillary properties.

4. A textile assistant, particularly adapted for use as a wool reserving agent, being the product of reaction of 1 mol. of 2-chlorobenzaldehyde-5-sulphonic acid with 1 mol. of naphthalene and 1 mol. of di-isobutyl-phenol, being when neutralised with an alkali and evaporated, a colorless powder of good solubility in water, the aqueous solutions of which possess remarkable capillary properties.

5. A textile assistant, particularly adapted for use as a wool reserving agent, being the product of reaction of 1 mol. of benzaldehyde-o-sulphonic acid with 1 mol. of naphthalene and 1 mol. of tertiary butyl-phenol, being when neutralised with an alkali and evaporated, a colorless powder of good solubility in water, the aqueous solutions of which possess remarkable capillary properties.

FRITZ BECHERER.